US006964175B2

(12) United States Patent
Karkhanis

(10) Patent No.: US 6,964,175 B2
(45) Date of Patent: Nov. 15, 2005

(54) EVAPORATIVE HEAT REJECTION

(75) Inventor: Rajiv K. Karkhanis, 4711 Apple Tree Dr., Roanoke, VA (US) 24012

(73) Assignees: Rajiv K. Karkhanis, Roanoke, VA (US); Aruna R. Karkhanis, Roanoke, VA (US)

(*) Notice: Subject to any disclaimer, the term of this patent is extended or adjusted under 35 U.S.C. 154(b) by 0 days.

(21) Appl. No.: 10/713,803

(22) Filed: Nov. 14, 2003

(65) Prior Publication Data
US 2005/0103038 A1 May 19, 2005

(51) Int. Cl.[7] .............................. F25B 39/04; F28D 5/00
(52) U.S. Cl. ........................................ 62/183; 62/305
(58) Field of Search ..................... 62/305, 171, 183, 62/184, 315, 316; 165/113, 104.11

(56) References Cited

U.S. PATENT DOCUMENTS

| | | | |
|---|---|---|---|
| 4,101,419 A | 7/1978 | Bergman | 209/13 |
| 5,106,543 A | 4/1992 | Dodds | 261/36.1 |
| 5,167,131 A | 12/1992 | Karkhanis | 62/262 |
| 5,301,551 A | 4/1994 | diVincenzo | 73/335.08 |
| 5,411,078 A | 5/1995 | Ares | 163/113 |
| 6,047,555 A | 4/2000 | Weng | 62/171 |
| 6,101,823 A | 8/2000 | Chiu et al. | 62/171 |
| 6,139,726 A | 10/2000 | Greene | 210/94 |
| 6,278,122 B1 | 8/2001 | Gagnon | 250/455.11 |
| 6,286,325 B1 | 9/2001 | Chiu et al. | 62/171 |
| 6,318,108 B1 | 11/2001 | Holstein et al. | 62/279 |
| 6,338,257 B1 | 1/2002 | Chiu et al. | 62/305 |
| 2002/0046569 A1 | 4/2002 | Faqih | 62/188 |
| 2002/0098109 A1 | 7/2002 | Nelson et al. | 422/5 |

FOREIGN PATENT DOCUMENTS

| | | |
|---|---|---|
| GB | 2 365 955 | 9/1998 |
| JP | 7303878 | 11/1995 |

OTHER PUBLICATIONS

Cemco, Furring "Hat" Channel Specification Sheet; undated, possible prior art.
Rain Bird Multi–Outlet Xeri–Bug; information from the internet; copyright 1996–2003.
AEGIS Microbe Shield; A Comparison of Antimicrobials For The Textile Industry: Bonded vs. Leaching; information from the internet; copyright 2000.

*Primary Examiner*—Chen Wen Jiang
(74) *Attorney, Agent, or Firm*—MacCord Mason PLLC

(57) ABSTRACT

A heat rejection apparatus includes an object conducting heat to be rejected, with an absorptive material on the outside of the object. A water system deposits water on the absorptive material to wet the material to absorb heat from the object by water evaporation. A collector below the object directs excess water to a drain. An air delivery system directs air over the absorptive material on the object. The water system supplies enough water to keep the absorptive material wet, even with the evaporative losses of water, and carry dissolved solids to the collector.

28 Claims, 4 Drawing Sheets

EVAPORATIVE HEAT REJECTION

BACKGROUND OF THE INVENTION

The present invention relates to an evaporative heat rejection method and apparatus, such as a condensing apparatus for use with air conditioners and other applications where cooling below ambient temperatures is required. Evaporative condensing substantially improves the efficiency of the air conditioner.

Air conditioners and other devices that need to reject heat at ambient conditions typically use air or water for this purpose. This may be done in one of the following ways:

1. Air at ambient temperature is passed over the heat exchanger containing the medium to be cooled. The Carnot cycle for such a system is depicted by the plot 1c, 2c, 3c, 4c in FIG. 1. For the refrigerant R-22, condensation takes place at 125° F.
2. Water from a city supply or other source is passed in a once-through system through a heat exchanger containing the medium to be cooled. The water leaving the heat exchanger is sent to the city drain or a lake.
3. Water is passed through heat exchanger containing medium to be cooled. After it cools the medium, this water is sent to a device like a cooling tower where it is cooled by evaporating a portion of water in the ambient air stream. Cooled water is then sent back through the heat exchanger in a continuous loop. Make up water is added to the system to compensate for three modes of losses:
    a. Water that is evaporated to cool the rest of the water.
    b. Water that is lost to the air stream.
    c. Water that is bled off to maintain the dissolved solids to an acceptable level. This amount of bleed off is determined by the level of dissolved solids in the available replacement water and maximum level of dissolved solids in the water to keep the maintenance to acceptable level. The Carnot cycle for this system is depicted by the plot 1b, 2b, 3b, 4b in FIG. 1. For the refrigerant R-22, condensation takes place at 105° F.
4. Water is evaporated on the surface of the heat exchanger containing the medium to be cooled. A large amount of water is sprayed on the heat exchanger surface, and ambient air is also forced over the heat exchanger containing fluid to be cooled. A very small portion of the water (about 1%) evaporates in the air, taking heat from the fluid inside the heat exchanger. Excess water is collected in a container, typically a water basin at the foot of the heat exchanger, where make up water is added to the system. This excess water and make up water is recirculated through the heat exchanger. The make up water is added to compensate for the same loss modes mentioned above.
5. Water is evaporated on the surface of the heat exchanger containing the medium to be cooled, and ambient air is also forced over the heat exchanger. The heat exchanger is covered with a water absorptive material. The amount of water sprayed on the heat exchanger is completely evaporated in cooling the medium to be cooled. No liquid water leaves the heat exchanger.
6. This method is in accordance with the present invention, and is not to be considered prior art. Water is evaporated on the surface of the heat exchanger containing the medium to be cooled, and ambient air is forced over the heat exchanger. Water evaporates in the ambient air, cooling the medium inside the heat exchanger. The heat exchanger is covered with a water absorptive material. The amount of water deposited or sprayed on the evaporator is equal to the sum of the water that is evaporated to cool the medium inside heat exchanger, and the water that is lost to the air stream. Excess water that leaves a heat exchanger without being evaporated carries concentrated dissolved substances away from the heat exchanger surface.

As noted, air at 35° C. (95° F.) dry bulb temperature and 23.89° C. (75° F.) wet bulb temperature may be expected to have a refrigerant condensing temperature of 51.67° C. (125° F.), in air only, using the method described in paragraph 1 above. Whereas water cooled and evaporative cooled equipment described in paragraphs 2 through 5, using the same air may be expected to have a refrigerant condensing temperature of 40.56° C. (105° F.). The Carnot cycle of the paragraph 6 method is depicted as 1a, 2a, 3a, 4a in FIG. 1, for a condensing temperature of 100° F., noticeably lower than for the other methods.

The method described in paragraph 1 also requires larger amount of air drawn over the heat transfer surface to carry the heat away, compared with that required in applications described in paragraphs 2 through 6. However, using water to cool in a once through system as described in paragraph 2 requires a large amount of water to be wasted. The cooling tower and recirculation described in paragraph 3 requires additional pumping capacity, additional fan capacity, and considerable maintenance (in terms of chemical additives and physical cleaning) to avoid formation of algae or other microorganisms and to avoid formation of scales. Scale reduces the heat transfer efficiency, or cause corrosion of the heat exchanger. Evaporative condensing as described in paragraph 4 eliminates the need for another device like a cooling tower while achieving temperatures in the medium to be cooled comparable to those obtained by using recirculated water. However, conventional evaporative condenser designs use recirculated water, thus causing maintenance problems previously described with respect to cooling towers. Certain inventions in recent past, described in paragraph 5, have proposed the use of a once-through system of water where water is completely evaporated in the evaporative condenser. This method leaves deposits of minerals previously dissolved in water on the heat transfer surface used, thus reducing the heat transfer efficiency of the heat exchanger and requiring elaborate cleaning and/or replacement of the heat transfer surface.

SUMMARY OF THE INVENTION

The present invention overcomes one or more of these deficiencies by providing an evaporative condensing apparatus including an evaporative condenser tubing extending from an upper portion to a lower portion. An absorptive material substantially covers and is in thermal transfer contact with the outside of the tubing. A compressor is configured to circulate refrigerant gas through the tubing, and a water system is adapted to deposit a controlled amount of water on the absorptive material to wet the material to absorb heat from the tubing by evaporation of water from the absorptive material. A collector below the lower portion of the tubing receives excess water from the tubing and directs excess water to a drain. An air delivery system directs air over the absorptive material on the coil. The water system supplies water to the upper portion of the tubing in sufficient quantity that the water wets the absorptive material, keeps the absorptive material wet from the upper portion to the lower portion, even with the evaporative losses of water, and excess water remains to carry dissolved solids to the collector.

Preferably, the water system supplies only enough water to provide excess water to carry enough dissolved solids to the collector so that scale from precipitated solids in the water does not build up on the tubing or absorptive material in sufficient quantity to degrade thermal transfer performance in a commercially significant amount. In one embodiment the water system includes an adjustment that permits the rate of water flow to be adjusted to achieve a level of water flow to provide excess water in correspondence with an expected dissolved solids concentration in the water.

The air delivery system may include a fan and be configured so that the airflow occurs over the absorptive material only when the fan motor is turned on and does not occur or occurs minimally when the fan motor is off, even when a strong wind is blowing. In one embodiment the tubing is arrayed around a central volume and surrounded by an air-impervious barrier that is open above and below the tubing, and the air delivery system includes a fan configured to direct air radially inward from below the barrier so the air must turn to pass axially over the absorptive material when the fan is on. The collector may be configured as a pan that inhibits axial airflow upstream of the radial inward airflow path. This configuration of the air circulation system may also reduce the noise of the compressor heard at five or more feet away from the compressor.

The absorptive material may be treated with an antimicrobial compound. Typically, the absorptive material is a textile material, such as cotton fabric. In another embodiment, an ultraviolet light source is positioned to direct ultraviolet light on the absorptive material to inhibit the growth of microorganisms. Also, the tubing is typically a metallic material such as copper, and that material may releases ions that inhibit the growth of microorganisms.

The apparatus may include a compressor proximate the tubing with an upper portion of the compressor subject to heating during operation and absorptive material on the upper portion. The water system may be adapted to deposit a controlled amount of water on the absorptive material on the upper portion of the compressor to wet the material to absorb heat from the upper portion by evaporation of water from the absorptive material on the upper portion of the compressor.

In one embodiment, the tubing is arrayed in a helical coil having a vertical axis so turns of the coil are vertically aligned, permitting excess water from an upper turn to follow the helical path of the coil when passing downward or to drip from the upper turn to a lower turn.

The invention may also be considered as a heat rejection apparatus including a solid object conducting heat to be rejected, having an outside and extending from an upper portion to a lower portion with an absorptive material substantially covering and in thermal transfer contact with the outside of the object. A water system is adapted to deposit a controlled amount of water on the absorptive material to wet the material to absorb heat from the object by evaporation of water from the absorptive material, and a collector below the lower portion of the object receives excess water from the object and absorptive material and directs excess water to a drain. An air delivery system directs air over the absorptive material on the object. The water system supplies water to the upper portion of the object in sufficient quantity that the water wets the absorptive material, keeps the absorptive material wet from the upper portion to the lower portion, even with the evaporative losses of water, and excess water remains to carry dissolved solids to the collector.

The invention may also be considered as a method of evaporative condensing including passing a refrigerant gas through tubing traversing a path having rungs substantially vertically arrayed and in thermal transfer contact with an absorptive material outside of the tubing, depositing a controlled amount of water on the absorptive material to wet the material to absorb heat from the tubing by evaporation of water from the absorptive material, collecting excess water below the tubing, and directing air over the absorptive material on the coil to evaporate water from the absorptive material. Depositing includes supplying water to the upper portion of the tubing in sufficient quantity that the water wets the absorptive material, keeps the absorptive material wet from the upper portion to the lower portion, even with the evaporative losses of water, and excess water remains to carry dissolved solids to the collector.

The method may also include compressing refrigerant gas and thereby generating heat to be rejected in a compressor having absorptive material in thermal contact therewith, and depositing a controlled amount of water on the absorptive material on the compressor to wet the material to absorb heat from the compressor by evaporation of water from the absorptive material and in sufficient quantity that the water wets the absorptive material, keeps the absorptive material wet, and excess water carries dissolved solids away.

The invention may also be considered as a method of heat rejection including providing a solid object conducting heat to be rejected and having rungs substantially vertically arrayed and in thermal transfer contact with an absorptive material outside of the solid object, depositing a controlled amount of water on the absorptive material to wet the material to absorb heat from the object by evaporation of water from the absorptive material, collecting excess water below the object, and directing air over the absorptive material on the object to evaporate water from the absorptive material. Depositing includes supplying water to the upper portion of the object in sufficient quantity that the water wets the absorptive material, keeps the absorptive material wet from the upper portion to the lower portion, even with the evaporative losses of water, and excess water remains to carry dissolved solids away.

Depositing preferably includes depositing only enough water to provide excess water to carry enough dissolved solids away so that scale from precipitated solids in the water does not build up on the object or absorptive material in sufficient quantity to degrade thermal transfer performance in a commercially significant amount.

The method may also include positioning the object so air passes over it substantially only when the airflow is desired and wind does not substantially cause airflow over the object. Preferably, the method includes inhibiting the growth of microorganisms on the absorptive material.

If the object is arrayed in a helical coil having a vertical axis so turns of the coil are vertically aligned, depositing may include depositing the water so excess water from an upper turn follows the helical path of the coil when passing downward or drips from the upper turn to a lower turn.

On a preferred evaporative condenser, supplied cooling water exceeds the amount needed to be evaporated by a certain amount, which is adjustable depending on quality of the water and the tolerance to scale formation. This has the advantage of the low energy consumption of an evaporative condenser but with a lower maintenance requirement than conventional evaporative condensers.

BRIEF DESCRIPTION OF THE DRAWINGS

The invention will be better understood by a reading of the Detailed Description of the Examples of the Invention along with a review of the drawings, in which:

In FIG. 2A the fan, fan guard and fan motor support are not shown, for simplicity. In FIG. 2B, the compressor and fan motor are not shown sectioned. Neither view shows the top condenser coil tube supports.

DETAILED DESCRIPTION OF EXAMPLES OF THE INVENTION

Figure 1:
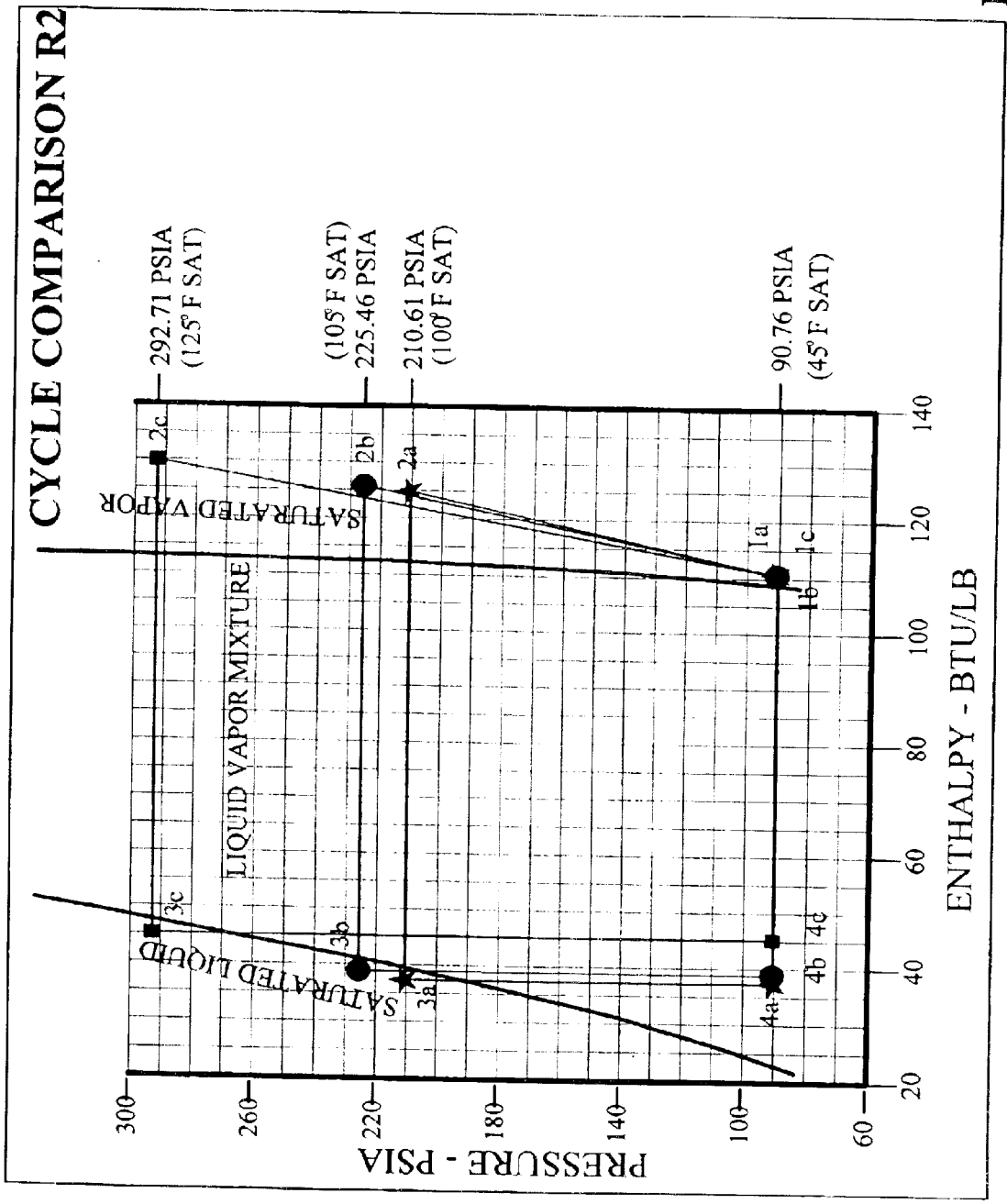
FIG. 1 is a Pressure enthalpy chart for Refrigerant R-22 with representations of simplified cycles for an embodiment of the present invention (a), typical water cooled refrigerant cycle (b), and typical air cooled refrigerant cycle (c).

FIG. 1 shows the enthalpy and pressure during the Carnot cycle for a typically used refrigerant gas, R-22, in a compressor/evaporator/condenser arrangement that is used in refrigerators, chillers, air conditioners, and heat pumps. The various portion of the cycle pertinent to the present invention visible in FIG. 1 are referred to in the following text as conditions 1a, 2a, 3a, and 4a.

Figure 2A:
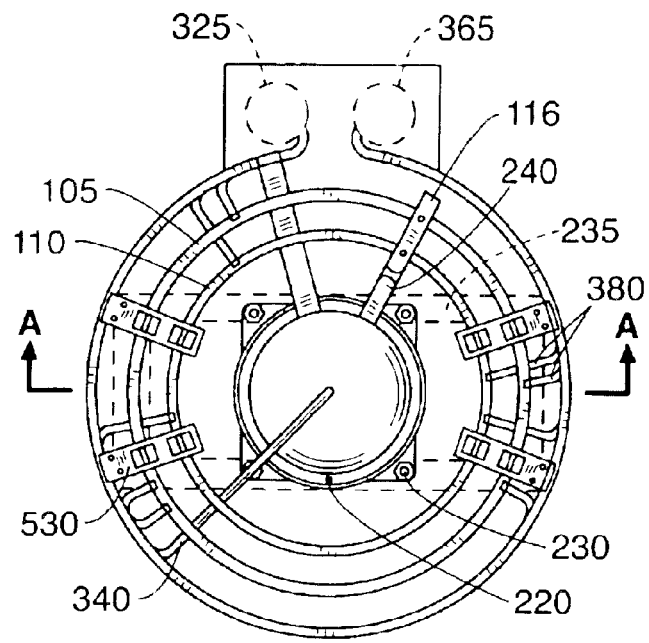
FIG. 2A is a plan and FIG. 2B is sectional elevation of the current invention in its preferred embodiment taken along lines A—A in FIG. 2A.
Figure 2B:
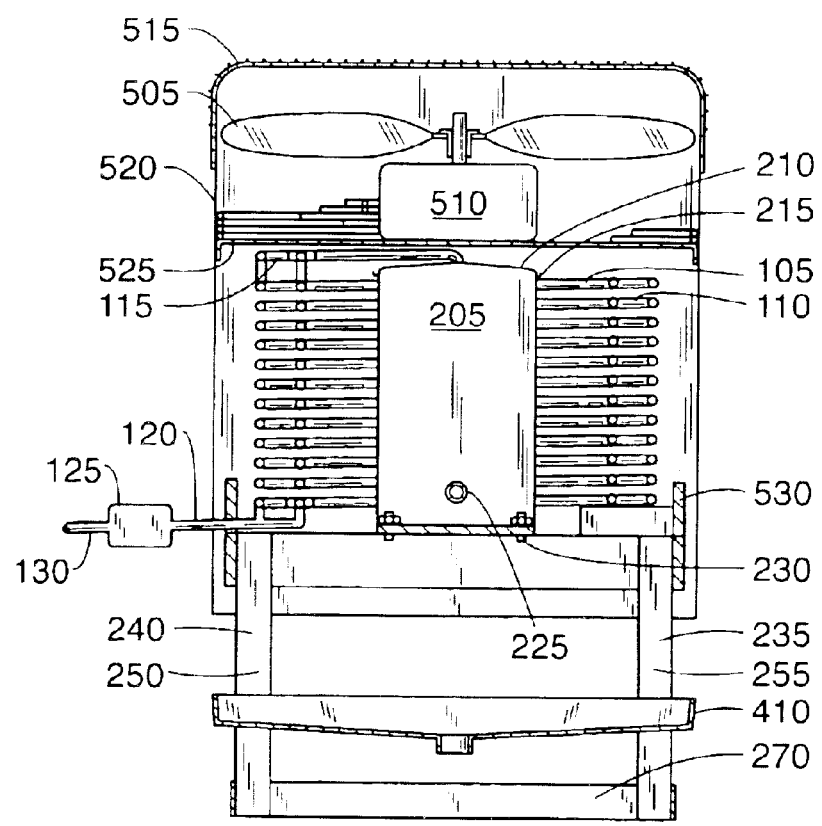
Figure 3:
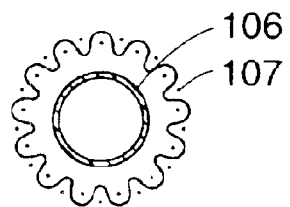
FIG. 3 is a cross-sectional view of a typical condenser coil metallic tube covered by water absorbent material.

FIGS. 2A, 2B and 3 show a heat rejecter such as a condenser with a multiplicity of coils 105 and 110 of metal tube 106, such as copper. The tube has an absorbent covering 107 (FIG. 3), which may be impregnated with an anti-microbial substance. The condenser coils 105 and 110 are in the form of a spiral so that the water deposited on the top of the tube will drip down to the tube course or rung below or will travel along the absorptive material spirally, until it reaches the bottom of the coil and finally drops into the water collection pan 410.

A tube 115 from the compressor 210 discharges refrigerant gas at condition 2a into the condenser coils 105 and 110. The refrigerant passes downwardly through the coils and gradually converts into the liquid form at condition 3a. At the end of the coils, it deposits into a liquid refrigerant tube 120. The liquid refrigerant then passes through a filter and drier 125 into the liquid line 130, which is connected to a conventional expansion valve (not shown). Liquid refrigerant then passes through the expansion valve into the evaporator coil at condition 4a. It is then sucked in by compressor 205 through inlet 225, at the condition 1a.

The top portion of the compressor 205 is covered by an absorptive material 210 (like covering 107 and preferably impregnated with anti-microbial substance) that extends as far as water collection ring 215. Water collection ring 215 is located at a height above which, the hot discharge gases come in contact with the exterior of the compressor. Water overflow tube 220 takes excess water from the ring 215 to the bottom of the compressor so that the water does not touch normally cooler parts of the compressor and heat up the suction gas inside that portion of the compressor 205. Compressor 205 is attached to the hat channels 235 and 240 by isolation package 230. Ends of the hat channels 235, and 240, are attached to vertical support channels 250, 255 (and others, not shown), to keep it off the floor. These rest on angles 270 on floor, and provide room for drain connection from collection pan 410.

Figure 5:
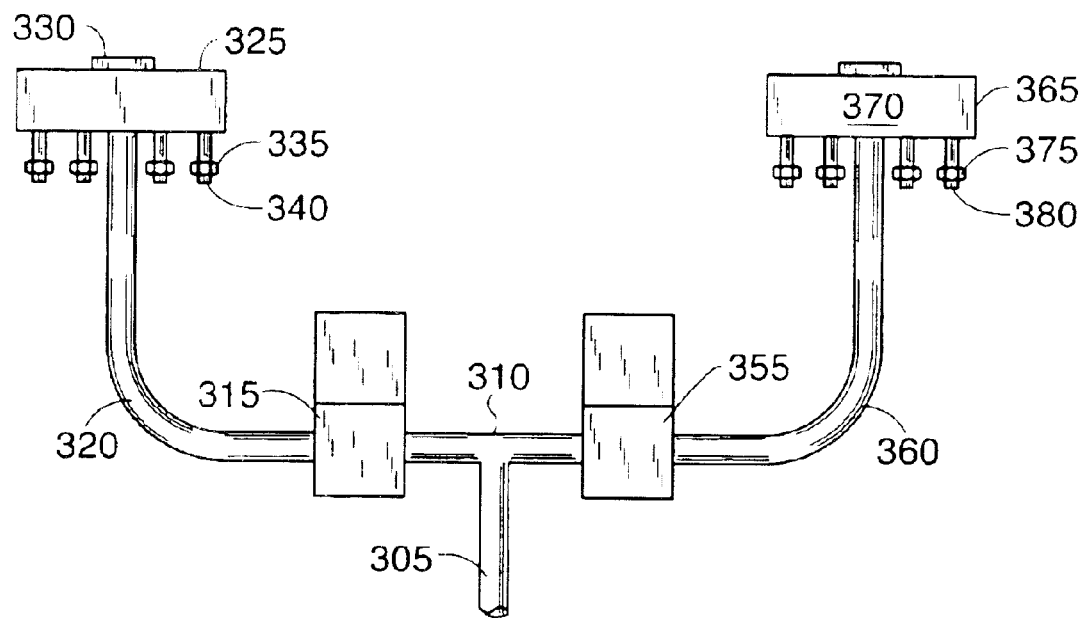
FIG. 5 is a schematic view of the valve arrangement for the water flow.

As seen in FIG. 5, a water system includes connection 305 that accepts water from the water supply at nominal municipal water pressure. Other water sources can be used. Connection 305 is connected to two-way water valves 315 and 355 through water tube 310. The valves may be controlled, such as by a microprocessor control described below. Water leaving the water valve 315 goes through supply tube 320 to distribution device 325 and filter (inside the device 325 and thus not shown) which deliver water to multiple water control devices 335 and multiple tubes 340, ends of which are located above condenser coil spirals 105 and 110. In addition, solenoid valve 355 connects through supply tube 360 to distribution device 365 and its contained filter which deliver water to multiple water control devices 375 and multiple tubes 380 when valve 355 is open. Other ends of tubes 380 are located at various points above condenser coil spirals 105 and 110. As the water wets the absorptive material on the coils and air flow flows around them to evaporate the water, heat is absorbed from the coils, so the refrigerant gas inside the tube is cooled and becomes liquid, as described earlier. Water from one of the tubes 340 is deposited on the water absorptive surface 210 on the top of compressor 205.

The tubes 350 may be configured like drip irrigation tubes. For example, RAIN BIRD™ Multi Outlet XERIBUG™ may be use as distributors and XERI-BUG™ emitters as the outlets, available from RainBird.com. The RAIN BIRD™ devices are available for various flow capacities, and it is within the scope of invention to select the flow capacity of the water supply device to achieve the flow parameters guided by the principles of the invention.

Alternatively, the water system may include an adjustment, such as a variable flow control valve or a metering pump, that permits the rate of water flow to be adjusted to achieve a desired level of water flow, using the principles of this invention. This adjustment is typically done upon installation, since the water quality and climate at a given location tends to be relatively consistent over time, but could be varied if circumstances warrant. For example, a humidity-responsive data element could be used in an algorithm to increase water flow when humidity is low and decrease water flow when humidity is high.

In another embodiment, the tubes 340 and 380 are soaking hoses that release water evenly all along their lengths depositing it directly on the top most run of the condenser coil spirals 105 and 110, so the water travels towards the bottom, as described above.

The desired water flow rates will be generally determined by prevailing climate and water supply conditions. The climate affects the Evaporation rate (E), the rate at which the water is evaporated to cool refrigerant. For hot, dry climates like Arizona, evaporation proceeds faster than in humid climates.

Water supplies almost invariably have dissolved solids, but the type and concentration of the dissolved solids varies by geography. The accumulation of these solids can lead to deposits being formed in the equipment, which can inhibit its thermal transfer efficiency and ultimately may lead to system failure. One manufacturer of recirculating systems recommends that solids be limited as set forth in Table 1:

TABLE 1

|  | G210 Galvanized Steel | Stainless Steel (Optional) |
|---|---|---|
| PH | 7 to 9.0 | 6.5 to 9.0 |
| Hardness as CaCO3 | 500 PPM MAX | 500 PPM MAX |
| Alkalinity as CaCO3 | 500 PPM MAX | 500 PPM MAX |
| Total Dissolved Solids | 1500 PPM MAX | 2000 PPM MAX |
| Chlorides As NaCl | 750 PPM MAX | 1500 PPM MAX |
| Sulfates | 500 PPM MAX | 750 PPM MAX |

Thus, the dissolved solids in the water supply are also taken into account in determining the desired water application rate.

The concept of cycles of concentration is commonly used in industrial/commercial cooling tower operation. As pure water is evaporated, minerals are left behind in the recirculating water. As evaporation continues, the water becomes more concentrated than the original make up water. This eventually can lead to saturated conditions. The term "cycles of concentration" compares the level of solids of the recirculating cooling tower to the level of solids of the original raw make up water. If the circulating water has four times the solids concentration than that of the make up water, then the cycles are 4. This concentration (or greater) continually passes over the entire coil.

Although the present invention does not involve recirculation, a similar nomenclature can be used. That is, the ratio of the solids concentration in the discharged water to the concentration in the applied water is herein referred to as the "cycles of concentration." Typically, the greater the applied water rate, the greater the discharged water rate, and the lower the cycles of concentration. In most instances the goal will be to apply enough water to keep the cycles of concentration low enough to prevent scale formation, but high enough to avoid excess water usage. Since the ending concentration is determinative of whether scale is likely to form, knowing the solids concentration in the input water enables the selection of appropriate cycles of concentration to prevent scale formation and avoid water wastage. It is an advantage of the preferred embodiment that only the lowermost portion or rungs of the heat rejecter or coil are subject to the maximum cycles of concentration, unlike recirculating systems.

According to the present invention, the dissolved solids can be kept below levels having adverse consequences by determining the cycles of concentration, defined below:

Leaving rate (L) is the rate at which the water leaves the evaporative condenser. This is analogous to Bleed rate in prior art recirculating systems.

Entering rate (N) is the rate at which the water is entering once-through evaporative condensers. This is analogous to Make-Up rate in prior art recirculating systems.

$$N = E + L$$

The Cycles of concentration (CoC) can be calculated as $$CoC = (\text{Evaporation rate} + \text{Leaving rate})/(\text{Leaving rate}) = (E+L)/L$$

Once the cycles of concentration and evaporation rate are determined, the amount of water needed on the condenser coils during compressor operation is established as follows:

Entering Water Rate, $N = (E \times CoC)/(CoC-1)$

Valve 315 is selected to provide a flow rate to provide the calculated value N. When there is demand for cooling and the compressor is turned on, valve 315 is energized and opens. It stays energized until demand for cooling is satisfied. Water thus distributes through distributor 325 at the desired rate N. This rate N is the sum of the water flow rates through individual water control devices 335.

Figure 4:
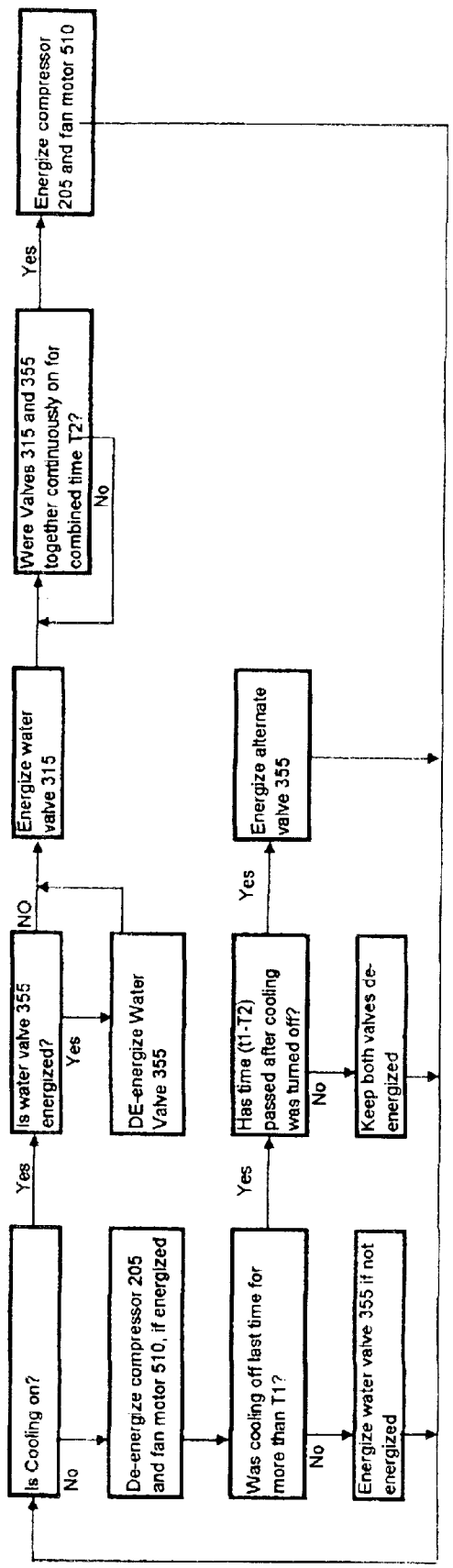
FIG. 4 is a flow chart of controller operation.

Valve 355 provides a flow substantially less than N, but above zero. The value is preferably again commensurate with the conditions, but the evaporative component, E, should be very reduced. When there is no call for cooling, (calls for cooling usually are signals from a thermostat) solenoid valve 315 is closed. The solenoid valve 355 is then opened if the time interval for which there was no cooling demand is less than adjustable time set point T1 (see FIG. 4). Otherwise the valve 355 is turned on adjustable time T2 less than the time there was no call for cooling the previous time. Valve 355, when energized, delivers water through the alternate tube 360, through alternate distributor 365 and controlled water distributing device 375 and tubes 380 to the coils 105 and 110. This minimizes the likelihood that the absorptive material will become completely dry, avoiding excessive build up of contaminant dissolved solids on the coils 105 and 110.

The expected cycles of concentration performance for the preferred embodiment per ton of cooling capacity for various water application rates is set forth in Table 2:

TABLE 2

| | Desired Cycles of concentration at the bottom of the entire column of coil | | | | | | | |
|---|---|---|---|---|---|---|---|---|
| | 2.000 | 2.500 | 3.000 | 4.000 | 5.000 | 6.000 | 7.000 | 8.000 |
| Water applied (GPH/ton) | 3.00 | 2.50 | 2.25 | 2.00 | 1.88 | 1.80 | 1.75 | 1.71 |
| Bleed to drain at the bottom (GPH/ton) | 1.5 | 1 | 0.75 | 0.5 | 0.375 | 0.3 | 0.25 | 0.2143 |
| Evaporation (GPH/ton) | 1.50 | 1.50 | 1.50 | 1.50 | 1.50 | 1.50 | 1.50 | 1.50 |
| At first 25% length segment Evaporation (GPH/ton) | 0.25 | 0.25 | 0.25 | 0.25 | 0.25 | 0.25 | 0.25 | 0.25 |
| | 0.375 | 0.375 | 0.375 | 0.375 | 0.375 | 0.375 | 0.375 | 0.375 |
| Bleed to next portion below (GPH/ton) | 2.625 | 2.125 | 1.875 | 1.625 | 1.500 | 1.425 | 1.375 | 1.339 |
| Cycles of concentration at segment end | 1.143 | 1.176 | 1.200 | 1.231 | 1.250 | 1.263 | 1.273 | 1.280 |
| At second 25% length segment | 0.5 | 0.5 | 0.5 | 0.5 | 0.5 | 0.5 | 0.5 | 0.5 |
| Evaporation (GPH/ton) | 0.750 | 0.750 | 0.750 | 0.750 | 0.750 | 0.750 | 0.750 | 0.750 |
| Bleed to next portion below (GPH/ton) | 2.250 | 1.750 | 1.500 | 1.250 | 1.125 | 1.050 | 1.000 | 0.964 |
| Cycles of concentration at segment end | 1.333 | 1.429 | 1.500 | 1.600 | 1.667 | 1.714 | 1.750 | 1.778 |
| At third 25% length segment | 0.75 | 0.75 | 0.75 | 0.75 | 0.75 | 0.75 | 0.75 | 0.75 |
| Evaporation (GPH/ton) | 1.125 | 1.125 | 1.125 | 1.125 | 1.125 | 1.125 | 1.125 | 1.125 |

TABLE 2-continued

| | Desired Cycles of concentration at the bottom of the entire column of coil | | | | | | | |
|---|---|---|---|---|---|---|---|---|
| | 2.000 | 2.500 | 3.000 | 4.000 | 5.000 | 6.000 | 7.000 | 8.000 |
| Bleed to next portion below (GPH/ton) | 1.875 | 1.375 | 1.125 | 0.875 | 0.750 | 0.675 | 0.625 | 0.589 |
| Cycles of concentration at segment end | 1.600 | 1.818 | 2.000 | 2.286 | 2.500 | 2.667 | 2.800 | 2.909 |
| Cycles of concentration at end | 2.000 | 2.500 | 3.000 | 4.000 | 5.000 | 6.000 | 7.000 | 8.000 |

In an alternate embodiment controller 405 monitors the water flow rate through the device 420, and controls a single variable flow water valve to maintain the water flow based on pre-determined level arrived at by such operational factors as, whether the compressor is operating and environmental factors such as the quality of water, location of installation so that there is substantially always a flow and the wet surfaces do not dry out unintentionally. This avoids build up of solid deposits previously dissolved in the water.

Excess water from the spiral condenser coils 105 and 110, and from the tube 230 from the compressor 205 falls in the excess water collection pan 410. This water is screened through wire mesh 415 and passes into water flow measurement device 420. Pan 410 is attached to the vertical hat channels 250, 255 in such a way that that there is a gap of a few inches between the bottom of the compressor 205 and condenser spiral coils 105 and 110 and the top of the pan 410. This gap allows the air to enter at the bottom of the condenser coils 105 and 110.

The excess water coming out of the measurement device 420 goes to a drain.

An airflow system includes fan 505, fan motor 510, wire mesh fan guard 515, air guidance enclosure 520, and a fan motor mount 525. The bottom of air guidance enclosure 520 is attached to the hat channels 235, and 240 with tube supports 530 in such a way that the bottom of the enclosure 520 is a few inches below the top of the hat channels 235, and 240. This creates a vertical passage having a cross sectional area larger than the area above coils 105 and 110 and compressor 205, through which the air and airborne contaminants are forced to travel against gravity, preventing a vast majority of contaminants such as dust from coming in contact with the absorbent material 107 on the condenser coils 105 and 110. There is also a gap between the bottom of the enclosure 520 and the excess water collection pan 410. In addition to collecting the excess water, the pan 410 serves to block off much of the axial airflow path so that when the fan 510 operates, the air cannot take a completely axial path. When the compressor is turned on, the fan is turned on simultaneously, or shortly before. This allows the air to be sucked in through the gap between the enclosure 520 and pan 410, over the condenser coils 105 and 110, over the compressor top 210, out the top of the apparatus. As can be seen, the air thus is directed radially inward, after which it makes a 90° turn to an axial upward flow. Dust in the air tends to settle into the pan 410 for discharge, rather than make the 90° turn. As mentioned earlier, this airflow along with the water on the condenser coils 105 and 110 allows the high-pressure refrigerant gas inside the condenser coils 105 and 110 to condense into refrigerant liquid.

A comparison of the performance of the cycle achievable with preferred embodiments of the current invention with typical air cooled condensing and water cooled condensing indicates that the preferred embodiment is almost 40% more efficient compared to air cooled and 18% more efficient compared to the water cooled units.

The absorbent material is typically a textile and can be woven, knitted, netted, non-woven, tufted or other construction. A presently preferred fiber is cotton because of its absorbency, but other suitable materials can be substituted. Depending on the material and tubing configuration, the material can be wrapped helically around the tubing, slipped over the tubing as a sleeve or wrapped as a longitudinal strip generally parallel with the tubing with free edges seamed or otherwise joined. Preferably, the absorbent material has antimicrobial properties, such as those imparted by treatment with an antimicrobial agent. By "antimicrobial agent" is meant any substance or combination of substances that kills or prevents the growth of microorganisms, and includes antibiotics, antifungal, antiviral and anti-algal agents. The antimicrobial agent can be either a "leaching" antimicrobial agent or a "molecularly bonded" antimicrobial agent. Leaching antimicrobials work by leaching or moving from the surface of the fabric to contact and kill a nearby microorganism. Molecularly bonded antimicrobial agents work by remaining affixed to the fabric and kill the microorganism as it contacts the surface to which the bonded antimicrobial has been applied. See White et al., "*A Comparison of Antimicrobials for the Textile Industry*", www.microbeshield.com.

Alternatively, antimicrobial properties can be imparted by adding an ultraviolet light source that irradiates the absorbent material to inhibit microbe growth. Also, antimicrobial properties are likely provided if the heat rejecter is copper. Copper ions that form on the absorbent material are known to have antimicrobial properties. Multiple antimicrobial mechanisms can be used.

The invention has been particularly described with reference to a helical condenser coil, but can be applied to other forms of heat rejection surfaces, including condensers of non-helical configuration, heat rejection objects in the form of a tubing or conduit with a fluid (gas, liquid or phase change material) therein that heats the tubing or conduit, and other heat rejection objects that are not condensers.

In the preferred embodiment of the invention, water, fresh from source, is released at various points at the top of the coil. As the water descends by gravity along the coil, part of it evaporates to cool and thereby condense refrigerant inside the coil. Due to this evaporation, the concentration of the dissolved solids in the water increases as the water travels down the coil. The water leaves the last section of the coil with the highest concentration of solids dissolved. In contrast, in evaporative condensing systems mentioned in paragraphs 3 and 4 in the background of invention, as a result of recirculation of the water, all the heat transfer surfaces come in contact with water having a solid concentration equal to or greater than that leaving the coils in the present invention. The present invention, thus, dramatically reduces the scale formation on the heat transfer surfaces. This reduces maintenance, and improves performance of the system between the maintenance.

Releasing the water by gravity from a municipal water supply at its delivery pressure eliminates the investment need and operating expense of a recirculating pump and piping.

In addition, because the preferred embodiments of the invention permit the condensation of vapor at lower temperatures, a greater compressor cooling capacity results.

The reduced average concentration of the dissolved solids in the water over the coil, enables the present invention to use less water than the evaporative condensing systems mentioned in paragraphs 3 and 4 in the background of invention.

Airflow over the condenser coil is controlled with the placement of the air flow guide to minimize the incidence of dust and dirt in the surroundings on the condenser coils. This is achieved by having the air change direction by 90 degrees and keeping the velocity of the air immediately after this turn lower than the velocity over the condenser coil. Any dirt coming in contact with the coil would have to travel against gravity to be deposited on condenser coil.

An air shield and/or other devices like enclosures with dampers used to control air flow reduces the compressor noise escaping the condensing apparatus, thus providing quieter operation compared to other condensing units. Dampers can also be used to close off the airflow passages when airflow is not needed.

While the invention has been specifically described with respect to R-22 refrigerant, those of ordinary skill will readily understand that the invention is not limited to that refrigerant. Others, by way of example and not limitation, include 410A, 407C and the range of HCFC and HFC refrigerants.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An evaporative condensing apparatus comprising
   an evaporative condenser tubing having an outside and extending from an upper portion to a lower portion,
   an absorptive material substantially covering and in thermal transfer contact with the outside of the tubing,
   a compressor configured to circulate refrigerant gas through the tubing,
   a water system adapted to deposit a controlled amount of water on the absorptive material to wet the material to absorb heat from the tubing by evaporation of water from the absorptive material,
   a collector below the lower portion of the tubing to receive excess water from the tubing and direct excess water to a drain, and
   an air delivery system to direct air over the absorptive material on the coil,
   wherein the water system supplies water to the upper portion of the tubing in sufficient quantity that the water wets the absorptive material, keeps the absorptive material wet from the upper portion to the lower portion, even with the evaporative losses of water, and excess water remains to carry dissolved solids to the collector.

2. An apparatus as claimed in claim 1 wherein the water system supplies only enough water to provide excess water to carry enough dissolved solids to the collector so that scale from precipitated solids in the water does not build up on the tubing or absorptive material in sufficient quantity to degrade thermal transfer performance in a commercially significant amount.

3. An apparatus as claimed in claim 2 wherein the water system includes an adjustment that permits the rate of water flow to be adjusted to achieve a level of water flow to provide excess water to carry enough dissolved solids to the collector so that scale from precipitated solids in the water does not build up on the tubing or absorptive material in sufficient quantity to degrade thermal transfer performance in a commercially significant amount, in correspondence with an expected dissolved solids concentration in the water.

4. An apparatus as claimed in claim 1 wherein the air delivery system includes a fan and is configured so that the airflow occurs over the absorptive material only when the fan motor is turned on and does not occur or occurs minimally when the fan motor is off, even when a strong wind is blowing.

5. An apparatus as claimed in claim 1 wherein the tubing is arrayed around a central volume and surrounded by an air-impervious barrier that is open above and below the tubing and the air delivery system includes a fan configured to direct air radially inward from below the barrier so the air must turn to pass axially over the absorptive material when the fan is on.

6. An apparatus as claimed in claim 5 wherein the collector is configured as a pan and inhibits axial airflow upstream of a radial inward airflow path.

7. An apparatus as claimed in claim 1 wherein the absorptive material is treated with an antimicrobial compound.

8. An apparatus as claimed in claim 1 wherein the absorptive material is a textile material.

9. An apparatus as claimed in claim 1 wherein the absorptive material is a cotton fabric.

10. An apparatus as claimed in claim 1 further comprising an ultraviolet light source positioned to direct ultraviolet light on the absorptive material to inhibit the growth of microorganisms.

11. An apparatus as claimed in claim 1 wherein the tubing is a metallic material that releases ions that inhibit the growth of microorganisms.

12. An apparatus as claimed in claim 1 further comprising a compressor proximate the tubing with an upper portion of the compressor subject to heating during operation, absorptive material being on the upper portion and the water system being adapted to deposit a controlled amount of water on the absorptive material on the upper portion of the compressor to wet the material to absorb heat from the upper portion by evaporation of water from the absorptive material on the upper portion of the compressor.

13. An apparatus as claimed in claim 1 wherein the tubing is arrayed in a helical coil having a vertical axis so turns of the coil are vertically aligned, permitting excess water from an upper turn to follow the helical path of the coil when passing downward or to drip from the upper turn to a lower turn.

14. An apparatus as claimed in claim 1 wherein the water system includes two flow paths of a higher and lower flow rate, and the water system uses the high flow rate path when cooling is needed, and the lower flow rate path at most other times.

15. An apparatus as claimed in claim 14 wherein the water system includes a controller to select between the two flow paths.

16. An apparatus as claimed in claim 1 wherein the water system includes a flow path adjustable between a higher and a lower flow rate, and the water system uses the high flow rate path when cooling is needed, and the lower flow rate path at most other times.

17. An apparatus as claimed in claim 16 wherein the water system includes a controller to select between the two flow rates.

18. An evaporative condensing apparatus comprising an evaporative condenser tubing having an outside and extending in a helical coil having a vertical axis so turns of the coil are vertically aligned arrayed around a central volume and surrounded by an air-impervious barrier that is open above and below the tubing, an absorptive material substantially covering and in thermal transfer contact with the outside of the tubing and treated with an antimicrobial compound, a compressor configured to circulate refrigerant gas through the tubing, a water system adapted to deposit a controlled amount of water on the absorptive material to wet the material to absorb heat from the tubing by evaporation of water from the absorptive material, a collector below the lower portion of the tubing to receive excess water from the tubing and direct excess water to a drain, the collector being configured as a pan and inhibiting axial airflow upstream of a radial inward airflow path, and an air delivery system to direct air over the absorptive material on the coil including a fan configured to direct air radially inward from below the barrier so the air must turn to pass axially over the absorptive material when the fan is on and airflow does not occur or occurs minimally when the fan motor is off, even when a strong wind is blowing, a compressor proximate the tubing with an upper portion of the compressor subject to heating during operation, absorptive material being on the upper portion and the water system being adapted to deposit a controlled amount of water on the absorptive material on the upper portion of the compressor to wet the material to absorb heat from the upper portion by evaporation of water from the absorptive material on the upper portion of the compressor, wherein the water system continually supplies water to the upper portion of the tubing in sufficient quantity that the water wets the absorptive material, water from an upper turn of the helical coil can follow the helical path of the coil when passing downward or drip from the upper turn to a lower turn and keep the absorptive material wet from the upper portion to the lower portion, even with the evaporative losses of water, and excess water remains to carry dissolved solids to the collector and the water system includes an adjustment that permits the rate of water flow to be adjusted to achieve a level of water flow to provide excess water to carry enough dissolved solids to the collector so that scale from precipitated solids in the water does not build up on the tubing or absorptive material in sufficient quantity to degrade thermal transfer performance in a commercially significant amount in correspondence with an expected dissolved solids concentration in the water.

19. A heat rejection apparatus comprising a solid object conducting heat to be rejected, having an outside and extending from an upper portion to a lower portion, an absorptive material substantially covering and in thermal transfer contact with the outside of the object, a water system adapted to deposit a controlled amount of water on the absorptive material to wet the material to absorb heat from the object by evaporation of water from the absorptive material, a collector below the lower portion of the object to receive excess water from the object and absorptive material and direct excess water to a drain, and an air delivery system to direct air over the absorptive material on the object, wherein the water system supplies water to the upper portion of the object in sufficient quantity that the water wets the absorptive material, keeps the absorptive material wet from the upper portion to the lower portion, even with the evaporative losses of water, and excess water remains to carry dissolved solids to the collector.

20. A method of evaporative condensing comprising passing a refrigerant gas through tubing traversing a path having rungs substantially vertically arrayed and in thermal transfer contact with an absorptive material outside of the tubing, depositing a controlled amount of water on the absorptive material to wet the material to absorb heat from the tubing by evaporation of water from the absorptive material, collecting excess water below the tubing, and directing air over the absorptive material on the coil to evaporate water from the absorptive material, wherein depositing includes supplying water to the upper portion of the tubing in sufficient quantity that the water wets the absorptive material, keeps the absorptive material wet from the upper portion to the lower portion, even with the evaporative losses of water, and excess water remains to carry dissolved solids to the collector.

21. A method as claimed in claim 20 further comprising compressing refrigerant gas and thereby generating heat to be rejected in a compressor having absorptive material in thermal contact therewith, and depositing a controlled amount of water on the absorptive material on the compressor to wet the material to absorb heat from the compressor by evaporation of water from the absorptive material and in sufficient quantity that the water wets the absorptive material, keeps the absorptive material wet, and excess water carries dissolved solids away.

22. A method of heat rejection comprising providing a solid object conducting heat to be rejected and having rungs substantially vertically arrayed and in thermal transfer contact with an absorptive material outside of the solid object, depositing a controlled amount of water on the absorptive material to wet the material to absorb heat from the object by evaporation of water from the absorptive material, collecting excess water below the object, and directing air over the absorptive material on the object to evaporate water from the absorptive material, wherein depositing includes supplying water to the upper portion of the object in sufficient quantity that the water wets the absorptive material, keeps the absorptive material wet from the upper portion to the lower portion, even with the evaporative losses of water, and excess water remains to carry dissolved solids away.

23. A method as claimed in claim 22 wherein depositing includes depositing only enough water to provide excess water to carry enough dissolved solids away so that scale from precipitated solids in the water does not build up on the object or absorptive material in sufficient quantity to degrade thermal transfer performance in a commercially significant amount.

24. A method as claimed in claim 22 wherein depositing includes depositing only enough water to provide excess water to carry enough dissolved solids away so that scale from precipitated solids in the water does not build up on the object or absorptive material in sufficient quantity to degrade thermal transfer performance in a commercially significant amount, in correspondence with an expected dissolved solids concentration in the water.

25. A method as claimed in claim 22 further comprising positioning the object so air passes over it substantially only when the airflow is desired and wind does not substantially cause airflow over the object.

26. A method as claimed in claim 22 further comprising inhibiting the growth of microorganisms on the absorptive material.

27. A method as claimed in claim 22 further comprising inhibiting the growth of microorganisms on the absorptive material by a release of ions from the object ions to inhibit the growth of microorganisms.

28. A method as claimed in claim 22 wherein the object is arrayed in a helical coil having a vertical axis so turns of the coil are vertically aligned, and depositing includes depositing the water so excess water from an upper turn follows the helical path of the coil when passing downward or drips from the upper turn to a lower turn.

* * * * *